Figure 1:
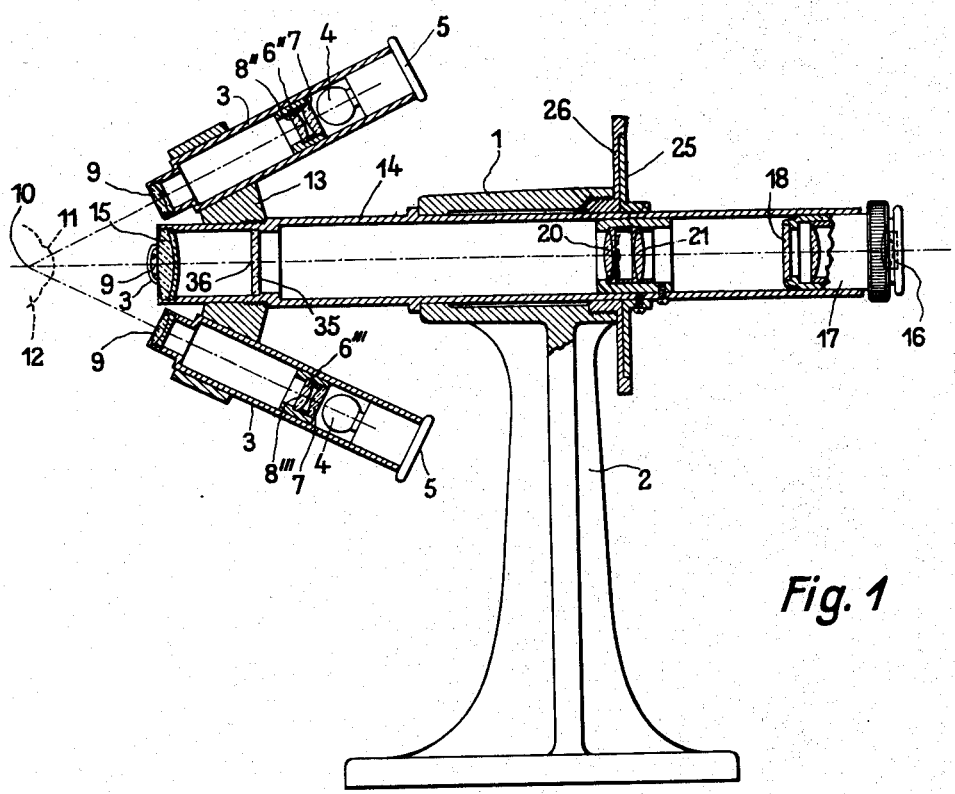

July 18, 1933.   H. HARTINGER   1,918,540
INSTRUMENT FOR MEASURING THE CURVATURE OF THE CORNEA
Filed March 12, 1931   2 Sheets-Sheet 1

Inventor:
Hans Hartinger

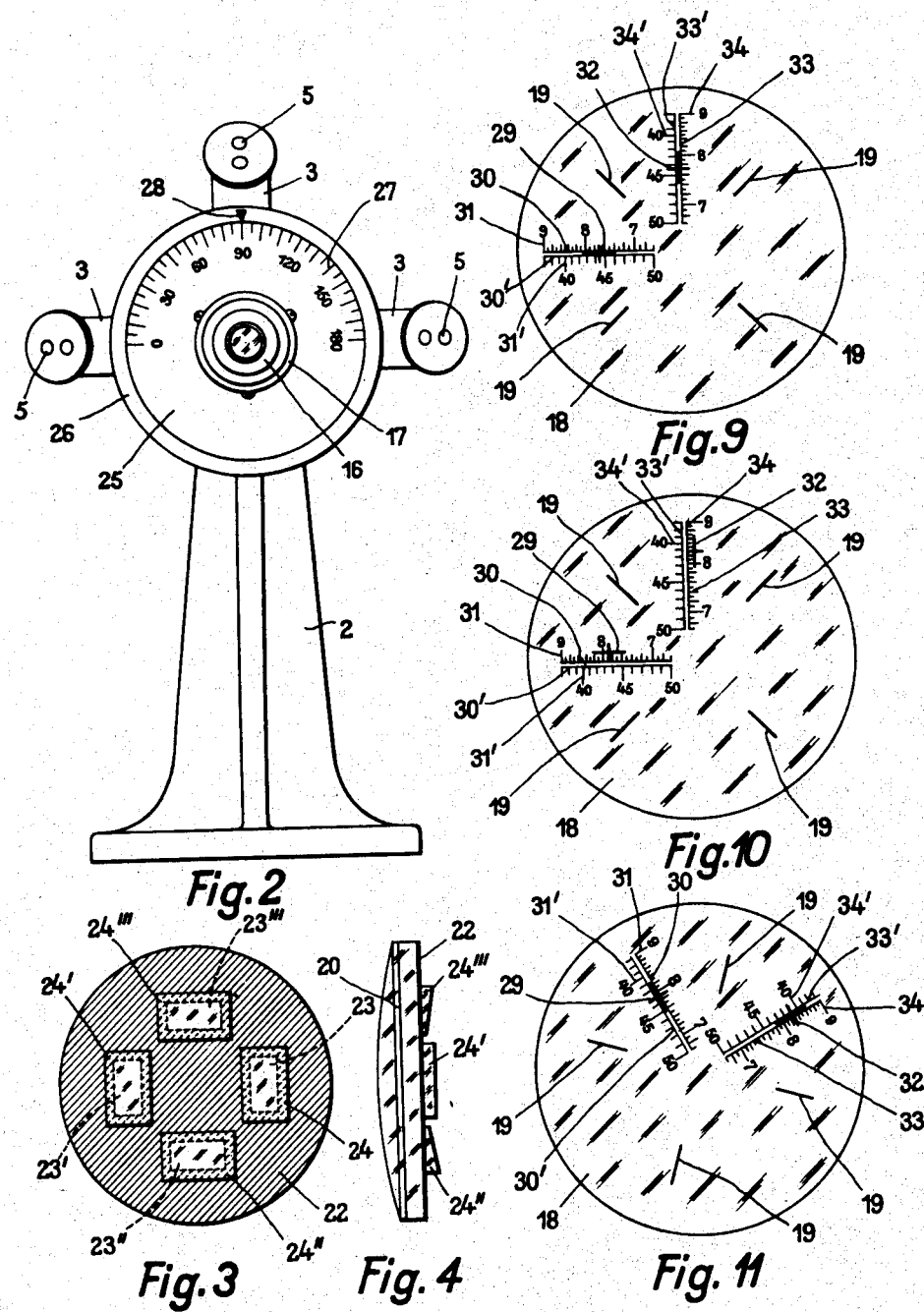

Patented July 18, 1933

1,918,540

UNITED STATES PATENT OFFICE

HANS HARTINGER, OF JENA, GERMANY, ASSIGNOR TO THE FIRM OF CARL ZEISS, OF JENA, GERMANY

INSTRUMENT FOR MEASURING THE CURVATURE OF THE CORNEA

Application filed March 12, 1931, Serial No. 521,969, and in Germany March 13, 1930.

I have filed an application in Germany, March 13, 1930, of which the following as a specification:

With the ophthalmometers used in oculist practice the radius of curvature of the surface of the cornea is generally measured by optically determining the size of the reflected image of an illuminated or transilluminated test object of known dimensions produced by the corneal surface. The living eye to be examined and, consequently, also the said image never being motionless prohibits taking a direct measurement with, say, a graduation provided in the ocular focal plane of a microscope. In the ophthalmometer, system Javal-Schiötz, use is made of two geometrical figures serving as test objects and allowing to be displaced symmetrically to the axis of the eye on a curved guide having its centre in the corneal vertex. The length of the test object is the distance between the exterior edges of the test figures the reflected images of which are viewed by means of a microscope. In the microscope is inserted a prism of double refraction which permits to obtain two images of each test object. That position of the test objects on the curved guide in which the one microscopic image of the test objects just touches the other microscopic image of these test objects in the sense of the measuring direction, allows of deducing the value of the corneal curvature. The corneal elements effective upon the measurement changing relatively to the displacement of the test objects, the described measuring method is disadvantageous in so far as the curvature is measured according to its value in different zones. An effected measurement will therefore not permit to know at once to which zone of the eye the just found value refers.

This inconvenience is overcome by the present invention. The new method consists therein that the eye is offered the view of the two test objects under an unchangeable angle, that optical means separate from the imaging ray pencil of the observing device two partial ray pencils, and that the mutual positions of the displaced images of the test objects permit of determining the value of the corneal curvature. The influence exerted by the distance of the test objects from the eye upon the size of the images produced by the corneal surface is very small in itself. Owing to the infinite distance of the test objects, this influence is without any effect. For this reason it is advisable to use collimators, which represent test objects at an infinitely great distance. Relatively to its position that zone of the corneal surface which must be applied for the measurement depends on the position which the cross sections of the separated imaging ray pencils have in the total cross section of the imaging rays. This position being unchangeable, always the same zone of the cornea is used for measuring. In practice it is in most cases advisable to so deviate both partial ray pencils in opposite senses by an optical means each that the images appear in the central part of the field of view of the observing device.

An instrument according to the invention is therefore suitably constructed as follows. The instrument is connected with two test objects whose positions relative to each other and to the observing device cannot be altered, for instance with two collimators whose axes lie in one plane with the axis of the observing device in such a manner that these axes intersect that of the observing device approximately in one point and under equal and unchangeable angles. In the path of the imaging rays of the observing device is provided a diaphragm stopping down the imaging ray pencil with the exception of two non-axial partial ray pencils, whereby the positions of the diaphragm apertures naturally must be adapted to the plane determined by the two test objects and the axis of the observing device. The sizes and positions of the apertures in the total cross section of the imaging rays determine the corneal zone upon which the measuring is based. In order to have as a basis for the observation a corneal zone concentric to the axis of the eye, both apertures are preferably of equal size and arranged oppositely each other at equal distances from the axis of the total ray pencil. It is advisable to provide in at least one of the paths of partial rays an optical deviating means in such a manner that the rays are deviated parallelly to the plane determined by the two test objects and the axis of the observing device and that the test object images appear near the centre of the field of view.

The test objects may be of any form. However, in order to facilitate measuring, the one of the test objects is conveniently constructed as a scale lying in the above mentioned plane and the other as an index indicating a point of this plane. When the said scale has a suitable division the sought value of the corneal curvature is represented by that point on the scale which is indicated by the index. No manipulation of moving parts being required the measuring process as well as the construction of the instrument is exceedingly simplified. Naturally the scale may be divided as well in such a manner that the dioptric effect of the refractive power of the cornea and the aqueous humor can be read off direct. A mark serving as a viewing point and being conveniently provided at a great distance, will in any case facilitate maintaining the patient's eye in the position required for measuring.

Eyes afflicted with astigmatism have, as is well known, different refractive powers in different meridional planes; these refractive powers have extreme values in two planes perpendicular to each other which are generally termed the principal section planes. For the examination of such eyes the instrument is conveniently so constructed that the test objects are rotatable together with the observing device about the axis of the same and that provision is made of an angle measuring device indicating the value of the turning angles. The astigmatism of the eye under examination is indicated by altitudinal deviations of the images of the test objects from the repeatedly mentioned plane, which deviations will disappear as soon as this plane coincides with one of the principal section planes. In addition to the determination of the refractive powers in the principal section planes the instrument therefore allows of being used also for finding the angular position of these principal section planes. Moreover, if two instruments according to the invention are combined in such a way that they have one common observing device, whereby the planes each of which is determined by two test objects belonging together and by the axis of the observing device perpendicularly intersect in the axis of the observing device, measuring is simplified in so far as, for obtaining the values for both principal section planes simultaneously, the instrument needs being turned only once. In this case two scales and two appertaining indices will appear in the field of view of the microscope. With a view to avoid any confusion in reading, each of the pairs of test objects belonging together may be given another colour.

It was stated already that an essential advantage of the new method consists therein that the measuring is based always on the same zone of the cornea of the eye under examination, the position of which is exactly known. Sometimes, however, it may be desired to measure the curvature of the cornea in any zone of a certain area. This is made possible by substituting the diaphragm separating the partial ray pencils by another one whose diaphragm apertures have a correspondingly different distance from the axis of the observing device. In this manner the whole of the corneal surface may be examined gradually by means of a set of diaphragms.

In order to be in a position to continuously effect such examinations over the whole corneal surface, the diaphragm may be constructed for instance in such a manner that its diaphragm apertures permit of being radially displaced, or in the image plane of the imaging system of the observing device may be disposed an additional diaphragm whose diaphragm apertures are so arranged that the images of the test objects lie in any case within the apertures. If now strips of spherical or cylindrical lenses, which would have to be provided immediately in front of or behind the said apertures, are slid in radial direction, the positions of the cross sections of the separated partial ray pencils seem to be altered in the total cross section of the imaging rays. In this case is altered the position of the apertures in the diaphragm separating the partial ray pencils, which serve as entrance pupils and are imaged by the imaging system of the observing device in the reverse ray path approximately in the tangential plane of the cornea. For allowing to examine eccentric zones of the cornea the viewing direction of the eye under examination must be altered relatively to the instrument. This is achieved in the most simple manner by radially displacing the mark serving as a viewing point.

Figures 5, 6, 7, 8:
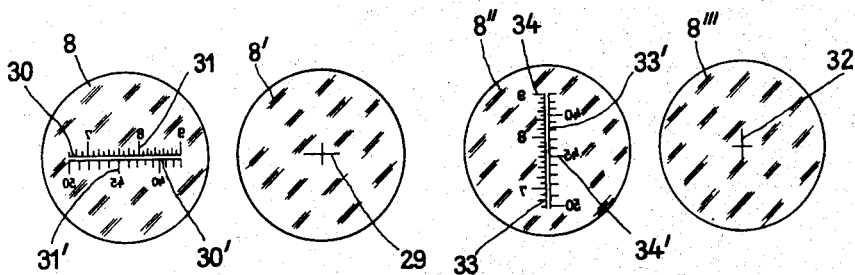

The accompanying drawings, which illustrate the invention, show a constructional example of an instrument with collimators for measuring the radius of curvature of the cornea. Figure 1 is a central section through the instrument in front elevation. Figure 2 is a view of the instrument in side elevation. Figures 3 and 4 illustrate a single part of the instrument on an enlarged scale in front and, respectively, in side elevation. Figures 5 and 6 represent on an enlarged scale the two condensers with the test objects of the collimators which lie in the horizontal plane and Figures 7 and 8 the condensers with the test objects of the collimators lying in the vertical plane. Figures 9, 10, and 11 respectively show on an enlarged scale the single part lying in the ocular image plane of the instrument, in the examination of an axially symmetrical eye, in the beginning of the measuring, and after adjustment to an eye afflicted with astigmatism.

The instrument is horizontally mounted in a bearing 1 resting on a foot 2 (cf. Figures 1 and 2) and consists of four collimators and a viewing microscope. The collimators are provided in housings 3 each having in its end an incandescent bulb 4 and a plug box 5. Behind the bulb 4 is disposed a condenser consisting of two plane concave lenses 6, 6', 6'' and, respectively, 6''' and 7 whose plane surfaces 8, 8', 8'' and, respectively, 8''', which are farthest away from the bulbs are provided with one test object each. Each of the surfaces 8, 8', 8'' and 8''' lies in the focal plane of one of the collimator lenses 9 disposed at the other end of the collimators. The axes of the collimators, whereof two lie in a horizontal and two in a vertical plane, intersect in a point 10 which approximately corresponds to the position of the centre of curvature of the cornea 11 of an eye to be examined, 12, opposite the instrument. The collimators are mounted in a support 13 screwed to the objective end of the viewing microscope. The axis of this microscope coincides with the intersection line of the planes determined by the two pairs of collimators.

In the objective end of the microscope tube, 14, is mounted an objective 15 and in the other end, in an ocular sleeve 17, is inserted a two-lens ocular 16. The sleeve 17 holds a plane parallel glass plate 18 whereof one surface is provided with four line marks 19 displaced 90° relatively to each other. Between the objective 15 and the ocular 16 is provided in the casing 14 a reversing system of two plane convex converging lenses 20, 21. The plane surface of the lens 20 (cf. Figures 1, 3 and 4) is covered by a film 22 preventing passage of light. In this film 22 are provided four quadrilateral apertures 23, 23', 23'' and 23''' which are covered by four refracting prisms, 24, 24', 24'', 24''' in the manner indicated by Figures 3 and 4.

The housing 14 supports a disc 25 which allows of being rotated in a guide disc 26 screwed to the bearing 1. The disc 25 has a graduation 27, and on the edge of the disc 26 an index 28 is provided.

The test objects of the collimators lying in the horizontal plane (Figures 5 and 6) are represented by cross lines 29 with elongated horizontal line and by a double division 31, 31' provided on two horizontal and parallel lines 30, 30' and having division numerals in mirror script. The arrangement is made in such a manner that the horizontal line of the cross 29 and the centre of the space between the lines 30, 30' lie in the plane determined by the collimator axes. The scales 31 and 31' are graduated to represent the radii of curvature in millimetres and, respectively, the refractive powers in dioptres. The test objects provided in the two other collimators (Figures 7 and 8) are arranged in quite the same manner with reference to the vertical plane of the collimator axes. These two test objects consist of cross lines 32 and a double scale 34, 34' provided on two parallel lines 33, 33'.

In the rear focal plane of the objective 15 is a plane parallel glass plate 35. On this glass plate 35 the rear focus of the objective 15 is indicated by means of a spot of luminous colour 36.

When using the instrument the observer views the eye 12 by means of the viewing microscope after having lighted the incandescent lamp 4 by connecting the plug box 5 to a light source. The ocular 16 of the viewing microscope is then so adjusted that the observer sees distinctly the lines 19 on the glass plate 18. It is hereby assumed that the index 28 has been previously adjusted to point at the value 90° on the graduation 27, which causes the plane determined by the axes of the two collimators containing the test objects 29 and 30, 31, 30', 31', to lie in horizontal position. The eye 12 views the luminous spot 36 which it sees at a great distance.

The test objects of all four collimators are imaged by reflection by the surface of the cornea 11 of the eye under examination 12. These test objects lying in the focal planes of the collimator lenses 9, they appear at an infinitely great distance and consequently are imaged in the focal plane of the reflecting surface of the cornea. The eye to be examined, 12, must now be given relatively to the viewing microscope that position which causes the focal plane of the corneal surface to be imaged by the objective 15 approximately in the front focal plane of the reversing lens 20. In this plane therefore appear also images of the test objects, whereby the images reflected in the focal plane of the cornea serve as objects for the objective 15.

The ocular sleeve 17 and the ocular 16 must be so displaced that the images which the reversing system 20, 21 produces of the test objects approximately in the rear focal plane of the lens 21 coincide with the plane of the cross lines 19. The observer may proceed also in such a manner that, with the plane of the cross lines 19 adjusted fixedly to the rear focal plane of the lens 21, he displaces the whole instrument in the direction of its axis until he can see at the ocular 16 sharply defined test mark images.

In the reverse path of rays the objective 15 images the surface of the film 22 of the lens 20 and the four apertures 23, 23', 23'', 23''' on a plane which touches the cornea 11 in its vertex. The consequence is that only those imaging rays can pass the lens 20 which have passed the aperture images lying in the vertex tangential plane, whereas all other imaging rays are stopped down. This procedure singles out that area of the cornea 11 upon which the examination is based and causes each of the apertures 23, 23', 23'', 23''' to be passed only by the imaging rays of one of the four test objects; the aperture 23''', for example, is passed only by the imaging rays of the cross lines 32 on the surface 8''' of the lens 6'''. The refracting angles of the prisms 24, 24', 24'' and 24''' covering the apertures 23, 23', 23'' and 23''' are so chosen that the test object images projected by the reversing systems 20, 21 are so far displaced in the direction of the optical axis of the microscope that the images of each two opposite test objects, that is to say the image of the cross lines 29 and the image of the cross lines 32 respectively cover on a well discernible place of the plane of the cross lines 19 on the glass plate 18 the image of the double scale 31, 31' and the image of the double scale 34, 34'. As with unaltered inclination of the collimator axes relative to the micrscope axis the value depends only on the displacement of the images produced by the cornea 11 from the elongation of the optical axis of the microscope and this distance, in its turn, only on the corneal curvature, the displacement resulting in the case of an eye 12 permits of arriving at a certain conclusion as to the value of the radius of curvature of the cornea 11 and, further, as the refractive power of the cornea and the aqueous humour is reversely proportional to this radius of curvature a conclusion can be drawn from this refractive power. Herefrom results the law for the division of the double scales 31, 31' and 34, 34' whose values can be found by calculation or experimentally, whereby naturally the dimensions of the instrument must be considered.

If the eye under examination is axially symmetrical the observer will see for instance the image illustrated by Figure 9. A characteristic feature of the said construction of the eye is that the longer lines of the test objects 29 and 32 divide by halves the spaces between the parallel lines 30, 30' and 33, 33' and the short lines indicate the same values on the two double scales 31, 31' and 34, 34'. These values are the sought values of the radius of the corneal curvature and of the refractive power.

Suppose that the principal section planes do not exactly coincide with the horizontal and the perpendicular plane through the microscopic axis, the observer will see in case of an eye afflicted with astigmatism, 12, for instance the image illustrated by Figure 10. This image is characterized by the fact that the long lines of the crosses 29 and 32 do not lie in the centre of the space between the parallel lines 30, 30' and, respectively, 33, 33'. In order to provide this coincidence the observer turns the instrument in the bearing 1 about its axis until at a certain turning angle to which the position of the principal section planes corresponds, the altitudinal difference is compensated (Figure 11). Now the position of the principal section planes is indicated by the index 28 on the graduation 27 and the sought value of the radii of curvature and the refraction values, which in the case of astigmatic eye naturally are different in both principal section planes, by the cross lines 29 and 32 on the double scales 31, 31' and, respectively, 32, 32'.

Together with the value of the radius of curvature of the cornea 11 also the size of the image of the test objects on the glass plate 18 is altered. Contrary thereto the value and position of the part of the cornea 11, upon which the measuring is based, is independent from the curvature of the cornea, for this part is determined alone by the size and arrangement of the apertures 23, 23', 23'', 23''' and the imaging scale determined by the objective 15.

I claim:

1. An instrument for measuring the curvature of the cornea, comprising an optical observing device, two collimator lenses, each collimator lens containing in its focal plane a test object, the collimator lenses being so disposed on the observig device that their axes lie in one plane with the axis of the observing instrument and intersect this axis at unchangeable angles approximately at one point, and a stop disposed in the observing device and having two apertures lying outside the axis of the observing device in a plane containing this axis and the axes of the two collimators.

2. An instrument for measuring the curvature of the cornea, comprising an optical observing device, two collimator lenses, each collimator lens containing in its focal plane a test object, the collimator lenses being so disposed on the observing device that their axes lie in one plane with the axis of the observing instrument and intersect this axis at unchangeable angles approximately at one point, a stop disposed in the observing device and having two apertures lying outside the axis of the observing device in a plane containing the axes of the two test objects, and at least one deviating optical means inserted in one of the paths of partial rays.

3. In an instrument according to claim 1, the one test object having a scale at right angles to the plane determined by the two test objects and the axis of the observing device, and the other test object being an index.

4. In an instrument according to claim 1, the one test object being a double scale at right angles to the plane determined by the two test objects and the axis of the observing device, and the other test object being an index.

5. An instrument for measuring the curvature of the cornea, comprising an optical observing device, this device comprising an objective, a system of reversing lenses provided behind the objective and an ocular, a means covering the aperture of the system of reversing lenses, this means having two apertures lying outside the axis of the said system of reversing lenses and in a plane with this axis, and two test objects provided on the observing device in unchangeable position relatively to each other and to the axis of the observing device in the said plane.

6. An instrument for measuring the curvature of the cornea, comprising an optical observing device, this device comprising an objective, a system of reversing lenses provided behind the objective and an ocular, a means covering the aperture of the system of reversing lenses, this means having two apertures lying outside the axis of the said system of reversing lenses and in a plane with this axis, two refractive wedges each arranged in front of one of the two said apertures, and two test objects provided on the observing device in unchangeable position relatively to each other and to the axis of the observing device in the said plane.

7. In an instrument according to claim 5, a mark disposed in the focal plane of the objective.

HANS HARTINGER.